(12) United States Patent
Baker

(10) Patent No.: US 9,251,492 B2
(45) Date of Patent: Feb. 2, 2016

(54) CUSTOMIZED-ENTERPRISE-SOFTWARE INTEGRATION SYSTEMS AND METHODS

(71) Applicant: Nuiku, Inc., Redmond, WA (US)

(72) Inventor: William P. Baker, Woodinville, WA (US)

(73) Assignee: Nuiku, Inc., Redmond, WA (US)

( * ) Notice: Subject to any disclaimer, the term of this patent is extended or adjusted under 35 U.S.C. 154(b) by 0 days.

(21) Appl. No.: 14/572,613

(22) Filed: Dec. 16, 2014

(65) Prior Publication Data

US 2015/0170073 A1   Jun. 18, 2015

Related U.S. Application Data

(60) Provisional application No. 61/916,677, filed on Dec. 16, 2013.

(51) Int. Cl.
*G06F 9/44* (2006.01)
*G06Q 10/06* (2012.01)

(52) U.S. Cl.
CPC ............... *G06Q 10/067* (2013.01); *G06F 8/35* (2013.01)

(58) Field of Classification Search
CPC ................................. G06F 8/35; G06Q 10/067
USPC ......................................................... 717/102
See application file for complete search history.

(56) References Cited

U.S. PATENT DOCUMENTS

| 2002/0198727 A1* | 12/2002 | Ann et al. ........................ 705/1 |
| 2007/0179825 A1* | 8/2007 | Dreiling et al. .................... 705/7 |
| 2008/0270977 A1* | 10/2008 | Nucci et al. ................... 717/105 |
| 2010/0286992 A1* | 11/2010 | Tkatch et al. .................. 705/1.1 |

OTHER PUBLICATIONS

Jinyoul Lee et al., "Enterprise integration with ERP and EAI", Feb. 2003, Magazine Communications of the ACM, vol. 46 Issue 2, pp. 54-60.*
Francisca Losavio et al., "Modeling EAI", 2002, Computer Science Society, pp. 195-203.*
Mark S. Fox et al., "Enterprise Modeling", 1998, AI Magazine, vol. 19 No. 3, pp. 109-122.*

* cited by examiner

*Primary Examiner* — Wei Zhen
*Assistant Examiner* — Lanny Ung
(74) *Attorney, Agent, or Firm* — AEON Law; Adam L. K. Philipp

(57) ABSTRACT

A third-party provider may integrate services with a customized enterprise-software tenancy via a tenant service context determined using an uncustomized data model and a tenant-customized data model from the enterprise-software provider. A difference map is generated for the tenant-customized data model with respect to the uncustomized data model, and is used to determine a mapped integrated-service data model, which facilitates integrating services with those of the enterprise-software provider. The mapped integrated-service data model is merged with the tenant-customized data model to obtain the tenant service context for the tenant. When a user provides an instruction to interact with the multi-tenant enterprise-software provider, the tenant service context is used to determine an action based on an interpretation of the instruction, and the enterprise-software provider is commanded to perform the action.

21 Claims, 7 Drawing Sheets

CUSTOMIZED-ENTERPRISE-SOFTWARE INTEGRATION SYSTEMS AND METHODS

CROSS-REFERENCE TO RELATED APPLICATIONS

This application claims the benefit of priority to Provisional Patent Application No. 61/916,677; filed Dec. 16, 2013; titled CUSTOMIZED-ENTERPRISE-SOFTWARE INTEGRATION SYSTEMS AND METHODS; and naming inventor William P. Baker. The above-cited application is hereby incorporated by reference, in its entirety, for all purposes.

FIELD

This disclosure is directed to the field of software, and more particularly, to systems and methods for automatically integrating with customized enterprise software.

BACKGROUND

Modern businesses above a certain size almost always use one or more types of enterprise software to advance their business objective and fulfill their business needs.

In the 1960's, large and medium size companies began to adopt data processing to help manage their operations. For the most part these companies acquired a medium to large size IBM mainframe, placed it in the basement and hired programmers to write applications specific to their business.

In the 1970's, Frank Dodge, John Cullinane, and others built software companies that made general-purpose business software (A/R, A/P, Payroll, Inventory, etc.) which they sold to a large range of businesses. Because this new generation of software replaced the purpose-built generation of software, it had to be highly customized for each customer, and customers expected the software to bend to their business process, not the other way around.

In the 1980's, 1990's, and 2000's this software category evolved into Enterprise Resource Planning (ERP) and grew to encompass accounting, manufacturing, supply chain, human resources and other business functions. As the scope of these packages, especially those from SAP, grew, customers spent more-and-more to customize them to their needs.

Until recently, a key characteristic of enterprise software, including ERP, was its location; companies have normally run enterprise software on their own equipment. That is, each installation serves one customer. Customization does not impact other customers, because no other customer uses the specific customized instance of the software.

Many examples of enterprise software are fundamentally directed to managing data and relationships that correspond to real-world business entities such as customers, products and shipments.

For example, enterprise software may be used to provide services such as automated billing, security, enterprise content management, IT service management, customer relationship management, enterprise resource planning, business intelligence, project management, collaboration, human resource management, manufacturing, enterprise application integration, enterprise forms automation, and the like.

Many businesses share similar needs for broadly categorized services such as those listed above. However, no two businesses are exactly identical. Consequently, almost all enterprise software allows a degree of configuration and customization. For example, various examples of enterprise software might include support for a customer-specific chart-of-accounts, customer-specific report formats, customer-specific processing logic, customer-specific workflows, and/or customer-specific logos and color schemes.

However, adapting enterprise software to fit the processes of a company is often performed by an expensive consultant and may include lengthy processes such as some or all of the following.

Needs assessment
    Planning and architecture design
    Database design
    Bi-directional data movement from and to other applications and data sources
    Workflow modeling
    Interface design and programming
    Programming to implement business rules Moreover, in many cases, customization is fragile. As vendors release new versions, customers or their vendors must merge the customizations from the previous version into the new version. As well, when business processes evolve, companies must change the software to match.

Until relatively recently, enterprise software installations were per-customer: each customer had its own copy. As a result, the customizations of a given customer only impacted one instance of the software.

More recently, software-as-a-service ("SaaS") providers have offered multiple tenants access to shared instances of enterprise software running in the so-called "cloud". SaaS enterprise software vendors include Salesforce.com of San Francisco, Calif.; Concur Technologies of Bellevue, Wash.; and the like.

In a "multi-tenant" architecture, multiple customers or "tenants" share a single instance of an enterprise software application, but each tenant typically has its own configuration data. Or more properly, each tenant has its own configuration meta data, which serve to describe to the application the tenant's customizations of the application.

For example, Salesforce.com ("SFDC") allows a tenant to customize its applications in various ways, including by adding new entities to or deleting entities from the tenant's database; adding, deleting, and/or modifying fields within a database entity; adding, deleting, and/or modifying validation rules; adding, deleting, and/or modifying user permissions; and the like.

In some cases, a third-party may provide services that integrate with a tenant's customized enterprise software instance. For example, one such third-party integrator is Nuiku, Inc. of Redmond, Wash., which provides natural-language "virtual assistant" services that integrate with enterprise software back-ends such as SFDC.

In order to answer an end-user's questions such as "how many interactions have I had with Mary Smith relating to Zirlow promotions?", the Nuiku services must take into account any customizations that the tenant and/or the end-user have made to their SFDC instance.

However, SFDC and similar SaaS enterprise-software providers do not necessarily make a complete set of all such tenant customization meta data available to third parties that wish to integrate with a tenant's customized enterprise software instance.

Consequently, each tenant that wishes to use a third-party's integrated services would traditionally employ a consultant to customize the third-party services to match the tenant's customized enterprise software instance. However, such manual customizations tend to be expensive, fragile, and hard to scale, requiring frequent or periodic manual intervention to maintain.

DESCRIPTION

Figure 1:
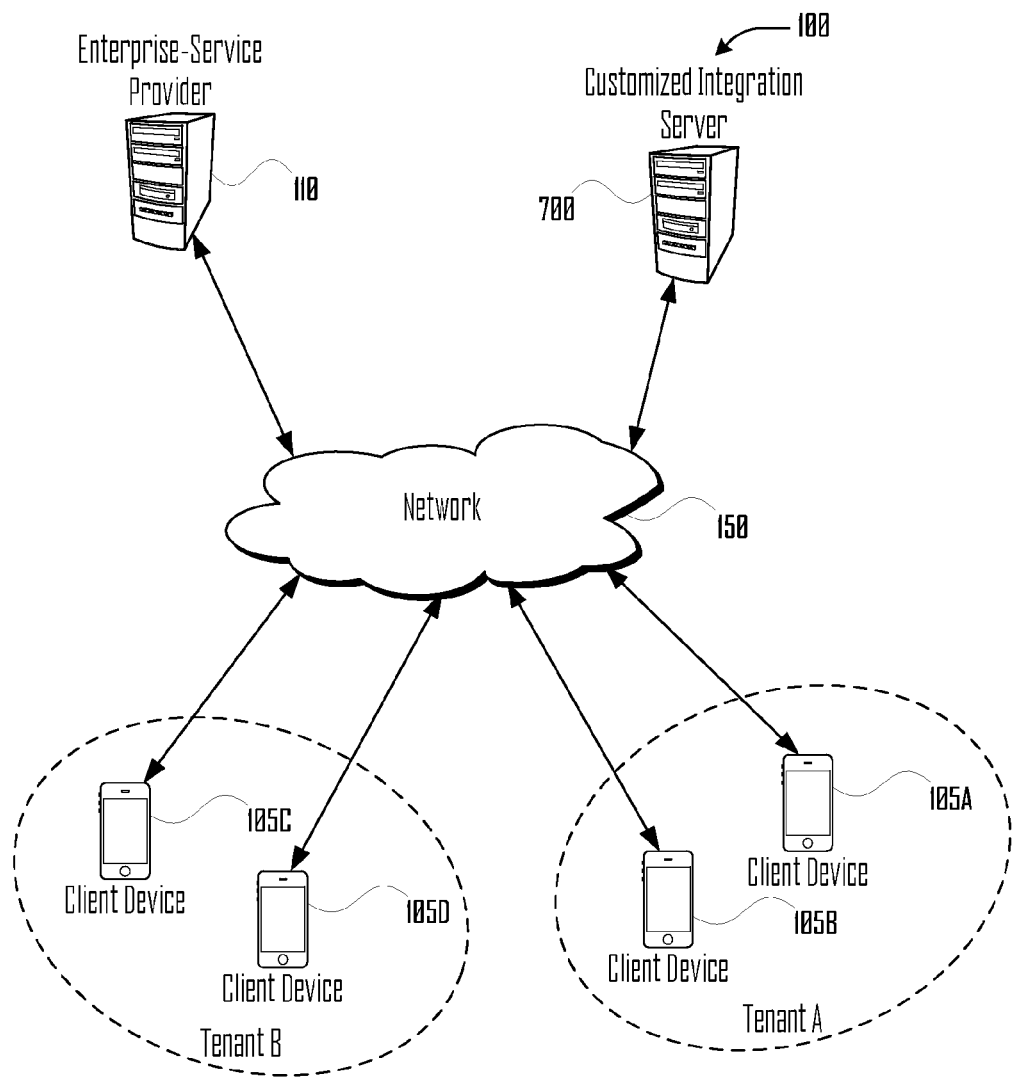
FIG. 1 illustrates a simplified customized enterprise-services system in which enterprise-service provider, customized-enterprise-software integration device, and client devices are connected to network.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

As discussed herein, in various embodiments, a processor and/or processing device may be configured (e.g., via non-transitory computer-readable storage media) to perform a first method for providing services that integrate with a customized enterprise software tenancy, the first method including steps similar to some or all of the following:

obtaining, from a user, an instruction to interact with a multi-tenant enterprise-software provider on behalf of the user, the user being associated with a tenant of a multiplicity of tenants of the enterprise-software provider;
obtaining a tenant service context;
determining an interpretation of the instruction according to the tenant service context;
determining an action based on the interpretation;
commanding the enterprise-software provider to perform the action;
proposing the action to the user for confirmation prior to commanding the enterprise-software provider to perform the action;
determining that the enterprise-software provider failed to perform the action as a result of outdated information in the tenant service context; and consequently performing the service-context sub-method to obtain an updated tenant service context; and/or
obtaining a subsequent instruction; determining a subsequent action based on an updated interpretation of the subsequent instruction according to the updated tenant service context; and commanding the enterprise-software provider to perform the subsequent action.

In some cases, obtaining the tenant service context may involve performing a service-context sub-method including steps similar to some or all of the following:

obtaining, from the enterprise-software provider, an uncustomized data model and a tenant-customized data model, the tenant-customized data model having been customized by and/or for the user such that it differs from those of other tenants of the multiplicity of tenants;
generating a difference map for the tenant-customized data model with respect to the uncustomized data model;
obtaining an integrated-service data model that facilitates integrating services with those of the enterprise-software provider, the integrated-service data model being expressed in terms of the uncustomized data model;
determining a mapped integrated-service data model according to the difference map such that the mapped integrated-service data model is expressed in terms of the tenant-customized data model;
merging the mapped integrated-service data model and the tenant-customized data model to obtain the tenant service context for the tenant; and/or
storing the tenant service context in association with the tenant;

In some cases, obtaining the instruction may include elements similar to some or all of the following:

obtaining a recording of an utterance spoken by the user; and/or
determining the instruction based at least in part on the recording.

In some cases, obtaining the tenant service context may include generating a derivative data model based on the tenant service context, or the like.

In some cases, determining the interpretation of the instruction may include interpreting the instruction according to the derivative data model, or the like.

Described more fully below are many additional details, variations, and embodiments that may or may not include some or all of the steps, features, and/or functionality described above.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a simplified customized enterprise-services system in which enterprise-service provider 110, customized-enterprise-software integration device 700, and client devices 105A-D are connected to network 150.

Enterprise-service provider 110 represents a provider of multi-tenant SaaS enterprise software, such as SFDC, Concur, and the like. In the illustrated example, enterprise-service provider 110 provides enterprise software services that are consumed by client devices 105A-D. Client devices 105A-B are associated with a first tenant (tenant A), and client devices 105C-D are associated with a second tenant (tenant B). Tenants A and B have each customized their instances of the enterprise software services. Such customization data is stored, among other things, by enterprise-service provider 110 in a database or similar data store (not shown).

Customized-enterprise-software integration device 700 (see FIG. 7, discussed below) represents a provider of services, such as Nuiku, that integrate with and/or extend those provided by enterprise-service provider 110.

In various embodiments, network 150 may include the Internet, a local area network ("LAN"), a wide area network ("WAN"), and/or other data network.

In various embodiments, client devices 105A-D may include desktop PCs, mobile phones, laptops, tablets, or other computing devices that are capable of connecting to network 150 and consuming services such as those described herein.

In many embodiments, additional tenants may be represented within the system, and each tenant may include more client devices than are displayed in FIG. 1.

In various embodiments, additional infrastructure (e.g., cell sites, routers, gateways, firewalls, and the like), as well as additional devices may be present. Further, in some embodiments, the functions described as being provided by some or all of enterprise-service provider 110 and customized-enterprise-software integration device 700 may be implemented via various combinations of physical and/or logical devices. However, it is not necessary to show such infrastructure and implementation details in FIG. 1 in order to describe an illustrative embodiment.

Figure 2:
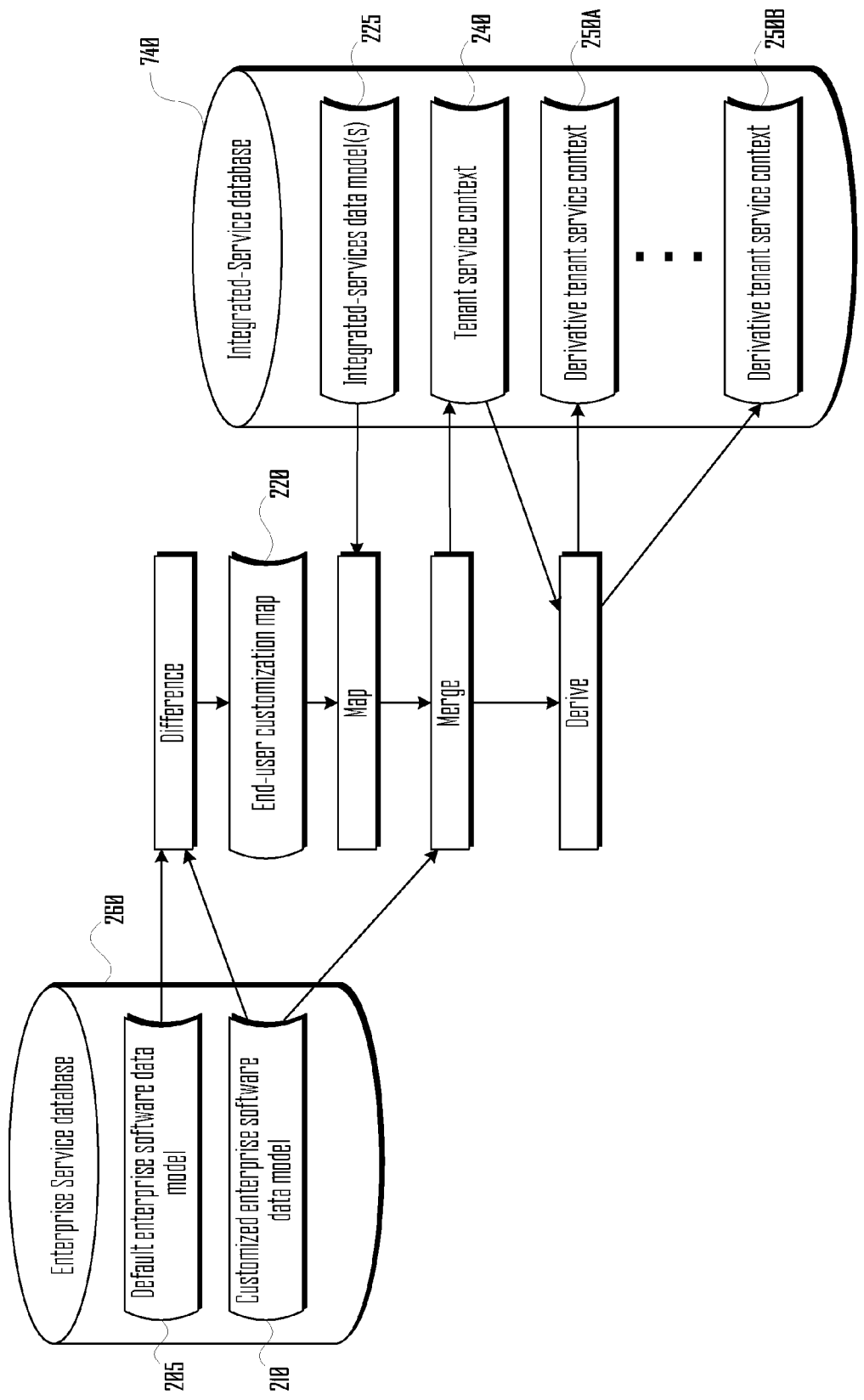
FIG. 2 illustrates a conceptual overview of a customized-enterprise-software integration solution, in accordance with one embodiment.

FIG. 2 illustrates a conceptual overview 200 of a customized-enterprise-software integration solution, in accordance with one embodiment.

Enterprise service database 260 is operated and/or maintained by a provider of multi-tenant SaaS enterprise software, such as the entity that operates SFDC. Customized-enterprise-software integration database 740 (see FIG. 7, discussed below) is operated and/or maintained by a third-party provider that offers services that integrate with those enterprise software services.

The services provided by multi-tenant enterprise-software provider are driven by default enterprise software data model 205, which describes various entities, attributes, and properties that the service utilizes. For example, to provide customer relationship management ("CRM") services, default enterprise software data model 205 may describe accounts, contacts, opportunities, activities, and other entities related to CRM purposes.

In reality, enterprise service database 260 may include multiple versions (not shown) of default enterprise software data model 205.

As discussed above, a given tenant of an enterprise-software provider typically customizes its instance of default enterprise software data model 205. Tenant-customized enterprise software data model 210 represents one such customized data model for a particular tenant. A contrived example is the addition of a field, called 'Height', to track the physical height of a contact. Furthermore, the tenant may require this Height data for every contact.

For another contrived example, default enterprise software data model 205 may include a description of an entity named or labeled "Opportunity", but a given tenant may have re-named or re-labeled this entity to "Investment". Many other types of customization are possible, including deleting or changing any entities, attributes, or properties included within default enterprise software data model 205, as well as adding new entities, attributes, or properties that do not exist in default enterprise software data model 205.

In reality, enterprise service database 260 would typically include at least one customized data model for each tenant it supports. Such additional tenant-customized data models are not shown in FIG. 2. In some cases, individual end-users within a given tenant may further customize tenant-customized enterprise software data model 210. Such end-user-customized data models are also not shown.

Such tenant customizations present challenges for third-party providers that wish to integrate their services with those provided by enterprise-software provider.

The third-party provider's services are driven by data, specifically by integrated-services data model(s) 225. Integrated-services data model(s) 225 describes, among other things, the concepts that the third-party provider understands from a linguistic and/or semantic perspective, as well as the maps between those concepts and the physical design of one or more back-end databases (e.g., enterprise service database 260). For example, in one embodiment, integrated-services data model(s) 225 may indicate that various linguistic terms (e.g., "cell", "mobile", "portable") all map to one or more semantic concept of a mobile phone. The integrated-services data models 225 may further indicate that data related to the semantic concept of a mobile phone is stored by a given enterprise-software provider in particular tables and/or fields of default enterprise software data model 205.

As illustrated by this example, integrated-services data model(s) 225 is expressed in terms of the default enterprise software data model 205. However, as discussed above, tenants (end-users and/or their companies), can and do have customized versions of the default enterprise software data model 205 (e.g., tenant-customized enterprise software data model 210). So, while integrated-services data model(s) 225 may describe semantics, data, and/or relationships related to the 'Opportunity' concept (as described in default enterprise software data model 205), a given tenant may have a customized data model (e.g., tenant-customized enterprise software data model 210) that has re-labeled this concept as 'Investment'. Consequently, if a user associated with that tenant sent a request such as "Show investments related to the ABC account," integrated-services data model(s) 225 may be unable to translate that request into an actionable command.

To avoid such difficulties, a third-party provider may employ a differencing process to generate an end-user customization map 220 that can be used to map integrated-services data model(s) 225 such that it is expressed in terms of tenant-customized enterprise software data model 210 and can be merged with tenant-customized enterprise software data model 210 to produce a tenant service context 240 that will enable users associated with the tenant to consume services in terms of tenant-customized enterprise software data model 210. Additionally, in some embodiments, one or more derivative tenant service context(s) 250 may be derived from tenant service context 240 to facilitate the provision of certain services that benefit from a specialized version of tenant service context. One embodiment of such a map/merge/derive process is shown in customized-data-model merge sub-routine 500 (see FIG. 5, discussed below).

Consequently, if a user associated with that tenant sent a request such as "Show investments related to the ABC account," tenant service context and/or derivative tenant service context(s) 250 may understand that the user is requesting information associated with a particular table (not shown) in tenant-customized enterprise software data model 210.

Figure 3:
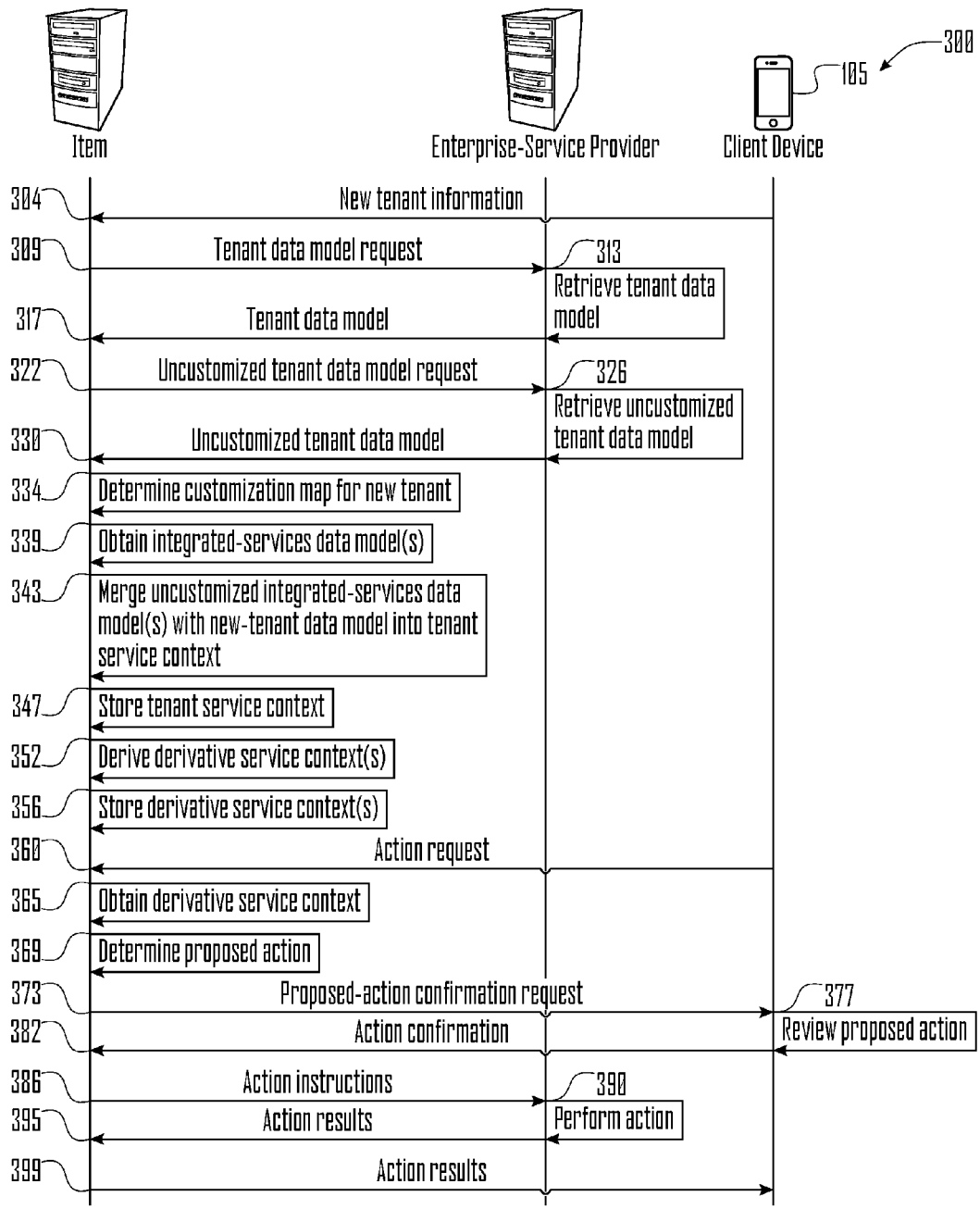
FIG. 3 illustrates an exemplary series of communications between _Server, enterprise-service provider, and client device in accordance with one embodiment.

FIG. 3 illustrates an exemplary series of communications between _Server, enterprise-service provider 110, and client device 105 in accordance with one embodiment. The communications shown in FIG. 3 do not encompass every combination of possibilities in which the systems and methods provided herein may be employed. Rather, the illustrated communications merely provide an overview of one simplified example scenario. Additional variations and alternatives are described more fully in the Figures and description that follow.

In the illustrated scenario, client device 105 is operated by an individual who is or is associated with an entity is an existing tenant of multi-tenant enterprise software services provided by enterprise-service provider 110. That tenant has customized its instance of the enterprise software services and now wishes to use services provided by _Server that need to integrate with the tenant's customized enterprise software services.

Beginning the illustrated sequence of communications, client device 105 sends to _Server new tenant information 304, such as credentials to access the tenant's data and/or meta data from enterprise-service provider 110. In the illustrated scenario, receiving such new tenant information 304 triggers a process to obtain a data model associated with the tenant from enterprise-service provider 110.

To that end, using the credentials or other tenant information provided by client device 105, Server sends to enterprise-service provider 110 a request 309 for a tenant data model associated with the tenant. Cf. tenant-customized enterprise software data model 210 (see FIG. 2, discussed above). Typically, Server may utilize an API provided by enterprise-service provider 110 for this purpose.

In response, enterprise-service provider 110 retrieves 313 the requested tenant data model and sends the requested tenant data model 317 to _Server.

As discussed above, in the illustrated scenario, the tenant has customized tenant data model 317 in ways that are currently unknown to Server. However, the data models that are used to enable the integrated services provided by Server, such as integrated-services data model(s) 225 (see FIG. 2, discussed above), are expressed in terms of a "default" or uncustomized data model, such as default enterprise software data model 205 (see FIG. 2, discussed above).

In order to properly integrate with the tenant's instance of the enterprise software provided by enterprise-service provider 110, Server needs to determine how tenant data model 317 differs from the default data model. In some embodiments, enterprise-service provider 110 may provide an API according to which Server may obtain a copy of the default data model. In other embodiments, a third-party provider may maintain an uncustomized tenancy with enterprise-service provider 110, and _Server may utilize an API provided by enterprise-service provider 110 to obtain a copy of the uncustomized-tenant's data model.

Using such an API provided by enterprise-service provider 110, _Server sends to enterprise-service provider 110 a request 322 for an uncustomized tenant data model.

In response, enterprise-service provider 110 retrieves 326 the requested uncustomized tenant data model and sends the requested uncustomized tenant data model 330 to _Server.

_Server determines 334 a customization map for the new tenant, the customization map indicating differences between uncustomized tenant data model 330 and the tenant's customized version. Generating such a customization map is described further in connection with block 520 (see FIG. 5, discussed below).

As discussed above, the services provided by Server are driven by an integrated-services data model, which is expressed in terms of the default, uncustomized data model. Server obtains 339 such an uncustomized integrated-services data model (e.g. from customized-enterprise-software integration database 740).

Using the customization map, _Server maps the uncustomized integrated-services data model(s) according to the customization map (such that it is expressed in terms of the customized tenant data model) and merges the resulting data with that tenant data model to generate a customized tenant service context.

Server stores 347 the tenant service context thereby generated to enable Server to handle subsequent requests posed in terms of the tenant's customized data model.

In some embodiments, a certain service may be provided more efficiently using a specialized version of the tenant service context. In such embodiments, _Server derives 352 one or more derivative service context(s) based on the generated customized tenant service context and stores the derivative service context(s) thereby derived.

At some subsequent point in time, client device 105 sends to _Server a request 360 to perform an action. In some embodiments, request 360 may take the form of a natural-language expression that may have been entered by a user and/or derived from a spoken utterance by the user. In embodiments in which the user may have uttered a spoken request, request 360 may be received via a speech-to-text server or module (not shown).

Server obtains 365 a suitable derivative service context, which Server uses to interpret the request 360 and determine 369 a proposed action based on the interpretation.

In some cases, such as when the proposed action involves writing data on behalf of the user, the proposed action may require confirmation that the proposed action is consistent with the user's intent. In such cases, _Server sends to client device 105 a request 373 for the remote user to confirm the proposed action before it is performed.

Client device 105 provides 377 the proposed action to the user for review and, upon user confirmation, sends to _Server a confirmation to perform the action.

In turn, _Server uses an API provided by enterprise-service provider 110 to send action instructions 386 so that enterprise-service provider 110 can perform 390 the instructed action.

Enterprise-service provider 110 sends to _Server action results 395, which action results 399 are sent to client device 105 for presentation to the user.

Figure 4:
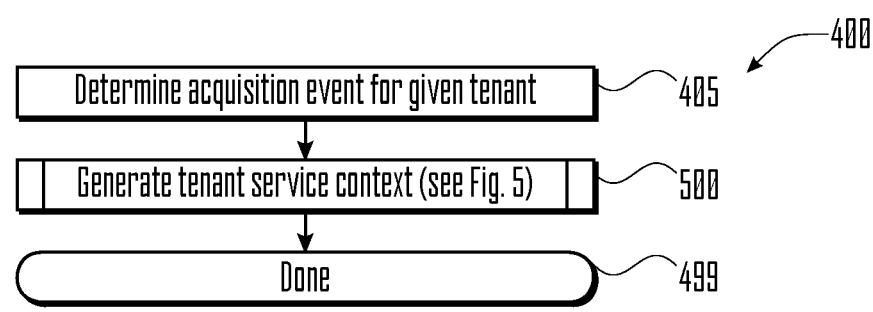
FIG. 4 illustrates a new-tenant routine for generating a tenant service context for a new tenant, such as may be performed by a customized-enterprise-software integration device in accordance with one embodiment.

FIG. 4 illustrates a new-tenant routine 400 for generating a tenant service context for a new tenant, such as may be performed by a customized-enterprise-software integration device 700 in accordance with one embodiment.

In block 405, new-tenant routine 400 determines that an acquisition event for a given tenant has occurred. For example, in one embodiment, new-tenant routine 400 may determine that a new tenant wishes to obtain services that integrate with a multi-tenant enterprise software service. In other embodiments, new-tenant routine 400 may determine that an existing tenant-customized enterprise software data model 210 should be updated for any of various reasons. For example, an update may be triggered periodically according to a fixed schedule, when a source data model changes, when the existing tenant-customized enterprise software data model 210 fails to successfully handle a user request, or for other like reasons.

In subroutine block 500, new-tenant routine 400 calls subroutine 500 (see FIG. 5, discussed below) to generate a tenant service context.

New-tenant routine 400 ends in ending block 499.

Figure 5:
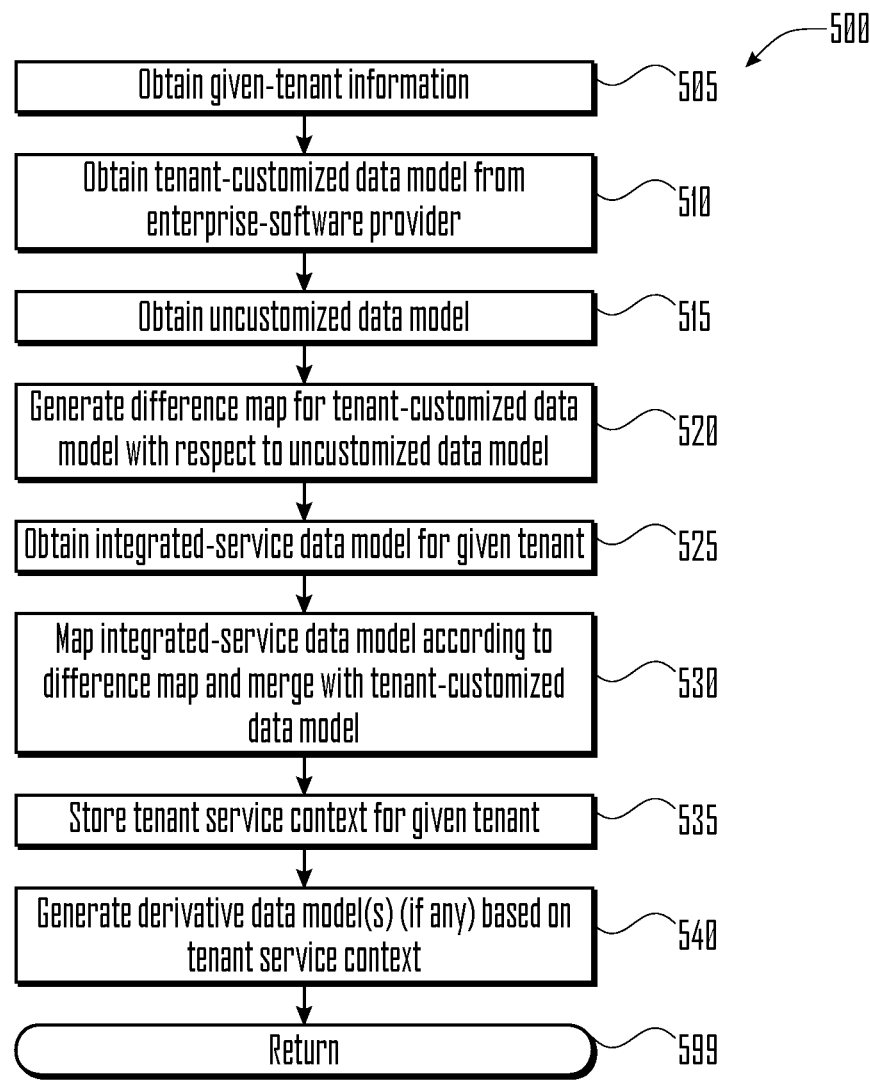
FIG. 5 illustrates a customized-data-model merge subroutine for merging an integrated-service data model with a tenant-customized data model of an enterprise software service for a given tenant, such as may be performed by a customized-enterprise-software integration device in accordance with one embodiment.

FIG. 5 illustrates a customized-data-model merge subroutine 500 for merging an integrated-service data model with a tenant-customized data model of an enterprise software service for a given tenant, such as may be performed by a customized-enterprise-software integration device 700 in accordance with one embodiment.

In block 505, customized-data-model merge subroutine 500 obtains information associated with the given tenant, such as credentials to access the tenant's data and/or meta data from a multi-tenant multi-tenant enterprise-software provider (e.g., enterprise-service provider 110).

In block 510, customized-data-model merge subroutine 500 obtains a tenant-customized data model from a multi-tenant enterprise-software provider using the credentials or other tenant information obtained in block 505. Cf. tenant-customized enterprise software data model 210 (see FIG. 2, discussed above). Typically, customized-data-model merge subroutine 500 may utilize an API provided by enterprise-software provider for this purpose.

As discussed above, to properly integrate with the tenant's instance of the enterprise software services, customized-data-model merge subroutine 500 needs to determine how the tenant-customized data model obtained in block 510 differs from a "default" or uncustomized data model provided by the enterprise-software provider. To that end, in block 515, customized-data-model merge subroutine 500 obtains an uncustomized data model.

In some embodiments, the multi-tenant enterprise-software provider may provide an API according to which customized-data-model merge subroutine 500 may obtain a copy of such an uncustomized data model. In other embodiments, customized-data-model merge subroutine 500 may obtain credentials that can be used to access an uncustomized tenancy with the enterprise-software provider and utilize an API provided by the enterprise-software provider to obtain a copy of the uncustomized-tenant's data model.

In block 520, customized-data-model merge subroutine 500 generates a difference map for the tenant-customized data model obtained in block 510 with respect to the uncustomized data model obtained in block 515. In various embodiments, generating such a difference map may utilize any suitable object differencing algorithm that takes a source object (here, the uncustomized data model) and a target object (here, the tenant-customized data model), and produces difference data such that given the source data and the difference data, one can reconstruct the target data. In other words, the generated difference map can be used to "patch" the uncustomized data model to produce the tenant-customized data model.

As discussed above, enterprise software data models are typically organized into one or more entities, each of which has one or more attributes, each of which have one or more properties. By analogy, an "entity" is conceptually similar to a database table (although not all vendors use relational database technology). Example entities in a CRM-oriented enterprise software service might include Accounts, Opportunities, Contacts, and the like.

An "attribute" is conceptually similar to a column or field within a database table. Example attributes of a Contacts entity include First Name, Last Name, Cell Phone Number, and the like.

A "property" is conceptually similar to a field property of a database field. Example properties might include a required flag, a maximum string length, view and/or edit permissions, and the like.

Tenant customizations (e.g., additions, deletions, and/or alterations) can affect any level (entity, attribute, and/or property). Consequently, a suitable object differencing algorithm would typically produce a difference map that indicates differences at each of these levels.

In block 525, customized-data-model merge subroutine 500 obtains an integrated-service data model for the given tenant. As discussed above, integrated-service data model is expressed in terms of the uncustomized data model, mapping linguistic terms to semantic concepts to particular entities and/or attributes within the uncustomized data model.

In block 530, customized-data-model merge subroutine 500 maps the integrated-service data model obtained in block 525 according to the difference map generated in block 520 and merges it with tenant-customized data model. As discussed above, the difference map generated in block 520 can be used to "patch" the uncustomized data model to produce the tenant-customized data model. However, in block 530, the difference map is used to "patch" or interpret the integrated-service data model such that it is expressed in terms of the tenant-customized data model and can be merged with tenant-customized data model to create a merged data model or tenant service context for the given tenant that will enable users associated with that tenant to consume services provided by a third-party provider of integrated services.

In block 535, customized-data-model merge subroutine 500 stores (e.g., in customized-enterprise-software integration database 740) the tenant service context merged in block 530 for the given tenant.

In some cases, a particular service may be provided more efficiently if the merged data model were reorganized in some way and/or merged with additional service-related data. In such cases, in block 540, customized-data-model merge subroutine 500 generates and stores for subsequent use one or more derivative data model(s) based on the tenant service context merged in block 530.

Customized-data-model merge subroutine 500 ends in ending block 599, returning to the caller.

Figure 6:
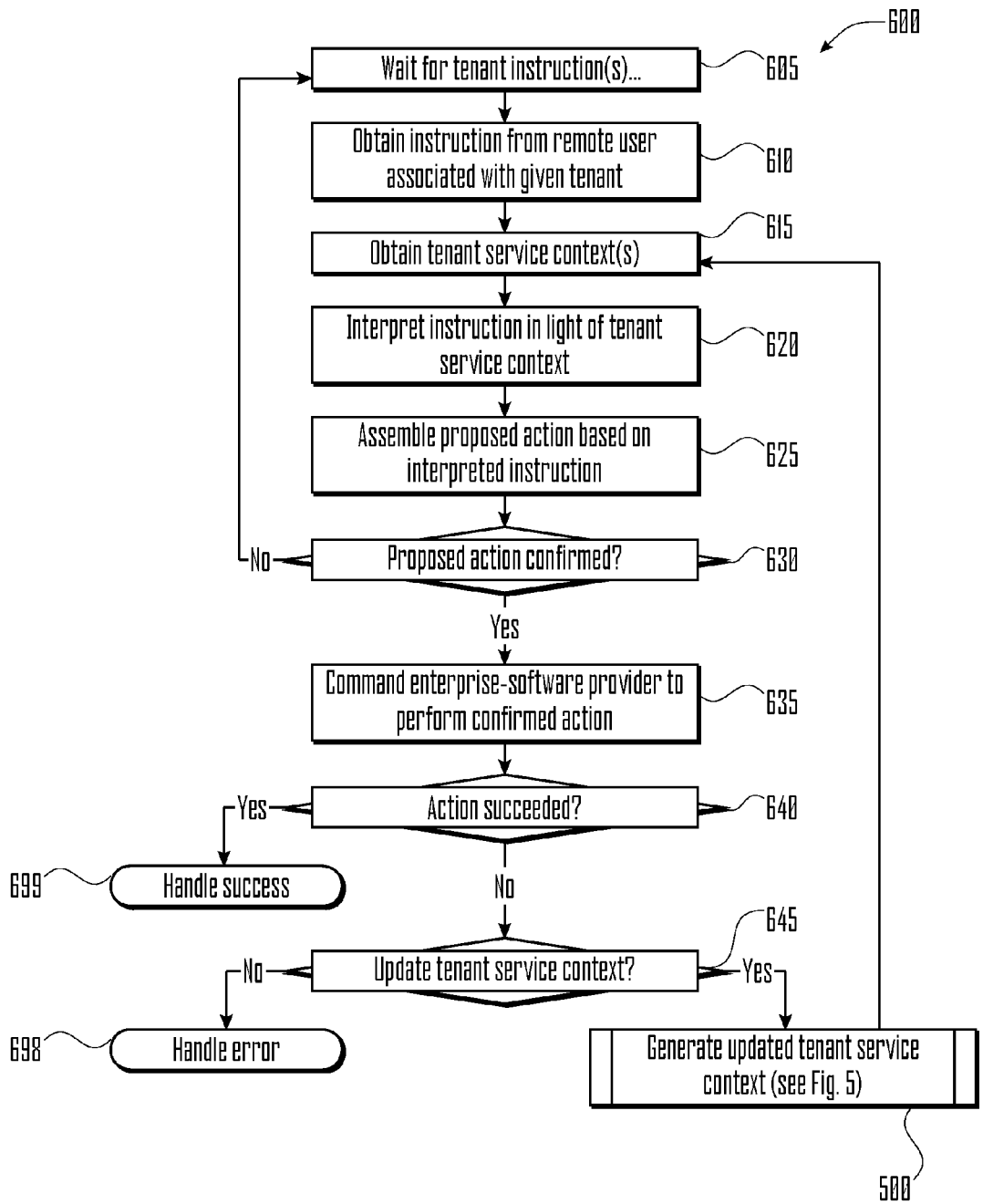
FIG. 6 illustrates a service-provision routine for providing services that integrate with a given tenant's customized enterprise software instance, such as may be performed by a customized-enterprise-software integration device in accordance with one embodiment.

FIG. 6 illustrates a service-provision routine 600 for providing services that integrate with a given tenant's customized enterprise software instance, such as may be performed by a customized-enterprise-software integration device 700 in accordance with one embodiment.

In block 605, service-provision routine 600 waits to receive an instruction from a user associated with a given tenant.

In block 610, service-provision routine 600 obtains an instruction from a remote user associated with the given tenant. For example, in one embodiment, service-provision routine 600 may receive an instruction that was originally entered and/or uttered into a remote mobile device operated by the user. In embodiments in which the user may have uttered a spoken request, the remote device or service-provision routine 600 may provide a recording of the request to speech-to-text server or module, with the textual results being provided to service-provision routine 600.

In block 615, service-provision routine 600 obtains (e.g. from customized-enterprise-software integration database 740) one or more tenant service context(s), or derivatives thereof, that are suitable for processing the requested instruction. In various embodiments, the tenant service context may correspond to one or more of tenant service context 240 and/or derivative tenant service context(s) 250 (see FIG. 2, discussed above) that may have been merged as described in reference to block 530 (see FIG. 5, discussed above).

In block 620, service-provision routine 600 uses the tenant service context obtained in block 615 to interpret the instruction received in block 610.

In block 625, service-provision routine 600 assembles a proposed action based on the interpreted instruction.

In some cases, such as when the proposed action involves writing data to or otherwise altering the given tenant's enterprise software instance, service-provision routine 600 may solicit confirmation from the user before performing and/or committing the action. In other embodiments, such as when the proposed action involves merely reading data, service-provision routine 600 may determine that user confirmation can be assumed.

In decision block 630, service-provision routine 600 determines whether the proposed action assembled in block 625 has either been confirmed by the user or does not require confirmation. If the user has confirmed or if no confirmation is required, then service-provision routine 600 proceeds to block 635. Otherwise, service-provision routine 600 loops back to block 605 to await further instruction. Other embodiments may be configured to omit decision block 630 and to always proceed to either block 635 or block 605.

In block 635, service-provision routine 600 commands the multi-tenant enterprise-software provider to perform the confirmed action. Typically, service-provision routine 600 uses an API provided by the multi-tenant enterprise-software provider for this purpose.

In decision block 640, service-provision routine 600 determines whether the enterprise-software provider successfully performed the action. If so, service-provision routine 600 ends in ending block 699, in which, service-provision routine 600 handles the successful performance of the action, such as by providing feedback for presentation to the user that his or her instruction was successfully carried out.

Otherwise, if in decision block 640, service-provision routine 600 determines that the action was not successfully performed, service-provision routine 600 proceeds to decision block 645. In decision block 645, service-provision routine 600 determines whether refreshing or updating the tenant service context may allow service-provision routine 600 to successfully perform the action.

For example, in some cases, the enterprise-software provider may have been unable to perform the action because tenant service context includes stale information. In various embodiments, tenant service context may include stale information for various reasons, such as if one of the data models from which tenant service context is merged has changed since the tenant service context was generated.

In such cases, in decision block 645, service-provision routine 600 may determine to refresh or update the given tenant's tenant service contexts before attempting the action again. If in decision block 645, service-provision routine 600 determines that the action failure was not likely caused by a stale tenant service context (e.g., because the tenant service context was recently updated or for other reasons), service-provision routine 600 ends in ending block 698.

Otherwise, if in decision block 645, service-provision routine 600 determines that the action may have failed because the tenant service context obtained in block 615 may be stale, then service-provision routine 600 proceeds to subroutine block 500. In subroutine block 500, service-provision routine 600 calls customized-data-model merge subroutine 500 (see FIG. 5, discussed above) to generate an updated tenant service context and zero or more derivatives thereof before looping back to block 615 to attempt to perform the action again.

In ending block 698, service-provision routine 600 handles the unsuccessful performance of the action, such as by providing an error notification for presentation to the user. In some embodiments and for some types of failure, service-provision routine 600 may solicit or otherwise obtain input from the user or another source to learn new information that may allow service-provision routine 600 to update one or more models associated with the action and try again.

Figure 7:
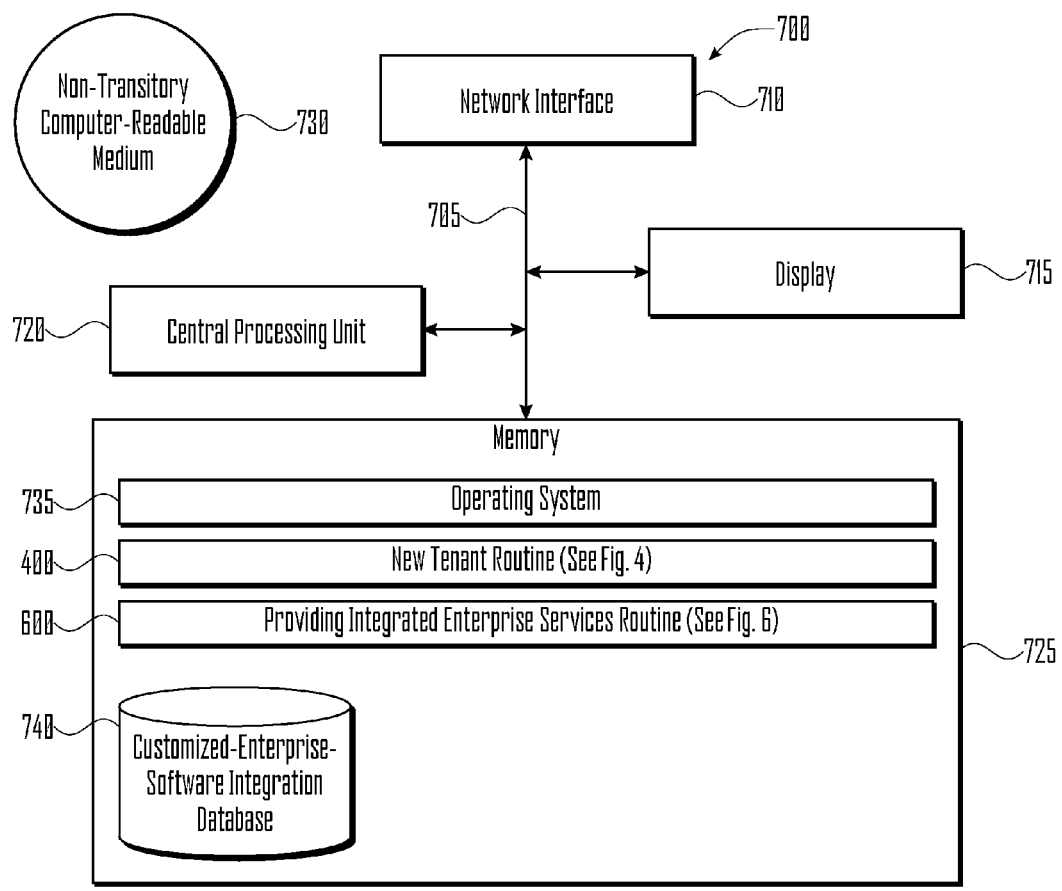
FIG. 7 illustrates several components of an exemplary customized-enterprise-software integration device in accordance with one embodiment.

FIG. 7 illustrates several components of an exemplary customized-enterprise-software integration device in accordance with one embodiment. In various embodiments, customized-enterprise-software integration device 700 may include a desktop PC, server, workstation, mobile phone, laptop, tablet, set-top box, appliance, or other computing device that is capable of performing operations such as those described herein. In some embodiments, customized-enterprise-software integration device 700 may include many more components than those shown in FIG. 7. However, it is not necessary that all of these generally conventional components be shown in order to disclose an illustrative embodiment.

In various embodiments, customized-enterprise-software integration device 700 may comprise one or more physical and/or logical devices that collectively provide the functionalities described herein. In some embodiments, customized-enterprise-software integration device 700 may comprise one or more replicated and/or distributed physical or logical devices.

In some embodiments, customized-enterprise-software integration device 700 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Customized-enterprise-software integration device 700 includes a bus 705 interconnecting several components including a network interface 710, a display 715, a central processing unit 720, and a memory 725.

Memory 725 generally comprises a random access memory ("RAM") and permanent non-transitory mass storage device, such as a hard disk drive or solid-state drive. Memory 725 stores program code for a new-tenant routine 400 for generating a tenant service context for a new tenant (see FIG. 4, discussed above) and a service-provision routine 600 for providing services that integrate with a given tenant's customized enterprise software instance (see FIG. 6, discussed above). In addition, the memory 725 also stores an operating system 735.

These and other software components may be loaded into memory 725 of customized-enterprise-software integration device 700 using a drive mechanism (not shown) associated with a non-transitory computer-readable medium 730, such as a floppy disc, tape, DVD/CD-ROM drive, memory card, or the like.

Memory 725 also includes customized-enterprise-software integration database 740. In some embodiments, customized-enterprise-software integration device 700 may communicate with customized-enterprise-software integration database 740 via network interface 710, a storage area network ("SAN"), a high-speed serial bus, and/or via the other suitable communication technology.

In some embodiments, customized-enterprise-software integration database 740 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A computer-implemented method for providing services that integrate with a customized enterprise-software tenancy, the method comprising:
obtaining, by the computer from a user, an instruction to interact with a multi-tenant enterprise-software provider on behalf of said user, said user being associated with a tenant of a multiplicity of tenants of said enterprise-software provider;
obtaining, by the computer, a tenant service context;
determining, by the computer, an interpretation of said instruction according to said tenant service context;
determining, by the computer, an action based on said interpretation; and
commanding, by the computer, said enterprise-software provider to perform said action;
wherein obtaining said tenant service context includes performing, by the computer, a service-context sub-method comprising:
obtaining, from said enterprise-software provider, an uncustomized data model and a tenant-customized data model, said tenant-customized data model having been customized by and/or for said user such that it differs from those of other tenants of said multiplicity of tenants;
generating a difference map for said tenant-customized data model with respect to said uncustomized data model;
obtaining an integrated-service data model that facilitates integrating services with those of said enterprise-software provider, said integrated-service data model being expressed in terms of said uncustomized data model;
determining a mapped integrated-service data model according to said difference map such that said mapped integrated-service data model is expressed in terms of said tenant-customized data model;
merging said mapped integrated-service data model and said tenant-customized data model to obtain said tenant service context for said tenant; and
storing said tenant service context in association with said tenant.

2. The method of claim 1, further comprising proposing said action to said user for confirmation prior to commanding said enterprise-software provider to perform said action.

3. The method of claim 1, further comprising:
determining that said enterprise-software provider failed to perform said action as a result of outdated information in said tenant service context; and consequently
performing said service-context sub-method to obtain an updated tenant service context.

4. The method of claim 3, further comprising:
obtaining a subsequent instruction;
determining a subsequent action based on an updated interpretation of said subsequent instruction according to said updated tenant service context; and
commanding said enterprise-software provider to perform said subsequent action.

5. The method of claim 1, wherein obtaining said instruction comprises:
obtaining a recording of an utterance spoken by said user; and
determining said instruction based at least in part on said recording.

6. The method of claim 1, wherein obtaining said tenant service context further comprises generating a derivative data model based on said tenant service context.

7. The method of claim 6, wherein determining said interpretation of said instruction comprises interpreting said instruction according to said derivative data model.

8. A computing apparatus for providing services that integrate with a customized enterprise-software tenancy, the apparatus comprising a processor and a memory storing instructions that, when executed by the processor, configure the apparatus to:
obtain, from a user, an instruction to interact with a multi-tenant enterprise-software provider on behalf of said user, said user being associated with a tenant of a multiplicity of tenants of said enterprise-software provider;
obtain a tenant service context;
determine an interpretation of said instruction according to said tenant service context;
determine an action based on said interpretation; and
command said enterprise-software provider to perform said action;
wherein the instructions that configure the apparatus to obtain said tenant service context further comprise instructions configuring the apparatus to perform a service-context sub-method comprising:
obtaining, from said enterprise-software provider, an uncustomized data model and a tenant-customized data model, said tenant-customized data model having been customized by and/or for said user such that it differs from those of other tenants of said multiplicity of tenants;
generating a difference map for said tenant-customized data model with respect to said uncustomized data model;
obtaining an integrated-service data model that facilitates integrating services with those of said enterprise-software provider, said integrated-service data model being expressed in terms of said uncustomized data model;
determining a mapped integrated-service data model according to said difference map such that said mapped integrated-service data model is expressed in terms of said tenant-customized data model;
merging said mapped integrated-service data model and said tenant-customized data model to obtain said tenant service context for said tenant; and
storing said tenant service context in association with said tenant.

9. The apparatus of claim 8, wherein the memory stores further instructions that further configure the apparatus to propose said action to said user for confirmation prior to commanding said enterprise-software provider to perform said action.

10. The apparatus of claim 8, wherein the memory stores further instructions that further configure the apparatus to:
determine that said enterprise-software provider failed to perform said action as a result of outdated information in said tenant service context; and consequently
perform said service-context sub-method to obtain an updated tenant service context.

11. The apparatus of claim 10, wherein the memory stores further instructions that further configure the apparatus to:
obtain a subsequent instruction;
determine a subsequent action based on an updated interpretation of said subsequent instruction according to said updated tenant service context; and
command said enterprise-software provider to perform said subsequent action.

12. The apparatus of claim 8, wherein the instructions that configure the apparatus to obtain said instruction further comprise instructions configuring the apparatus to:
obtain a recording of an utterance spoken by said user; and
determine said instruction based at least in part on said recording.

13. The apparatus of claim 8, wherein the instructions that configure the apparatus to obtain said tenant service context further comprise instructions configuring the apparatus to generate a derivative data model based on said tenant service context.

14. The apparatus of claim 13, wherein the instructions that configure the apparatus to determine said interpretation of said instruction further comprise instructions configuring the apparatus to interpret said instruction according to said derivative data model.

15. A non-transitory computer-readable storage medium having stored thereon instructions including instructions that, when executed by a processor, configure the processor to:
obtain, from a user, an instruction to interact with a multi-tenant enterprise-software provider on behalf of said user, said user being associated with a tenant of a multiplicity of tenants of said enterprise-software provider;
obtain a tenant service context;
determine an interpretation of said instruction according to said tenant service context;
determine an action based on said interpretation; and
command said enterprise-software provider to perform said action;
wherein the instructions that configure the processor to obtain said tenant service context further comprise instructions configuring the processor to perform a service-context sub-method comprising:
obtaining, from said enterprise-software provider, an uncustomized data model and a tenant-customized data model, said tenant-customized data model having been customized by and/or for said user such that it differs from those of other tenants of said multiplicity of tenants;
generating a difference map for said tenant-customized data model with respect to said uncustomized data model;
obtaining an integrated-service data model that facilitates integrating services with those of said enterprise-software provider, said integrated-service data model being expressed in terms of said uncustomized data model;
determining a mapped integrated-service data model according to said difference map such that said mapped integrated-service data model is expressed in terms of said tenant-customized data model;
merging said mapped integrated-service data model and said tenant-customized data model to obtain said tenant service context for said tenant; and
storing said tenant service context in association with said tenant.

16. The non-transitory computer-readable storage medium of claim 15, having stored thereon further instructions that further configure the processor to propose said action to said user for confirmation prior to commanding said enterprise-software provider to perform said action.

17. The non-transitory computer-readable storage medium of claim 15, having stored thereon further instructions that further configure the processor to:
determine that said enterprise-software provider failed to perform said action as a result of outdated information in said tenant service context; and consequently
perform said service-context sub-method to obtain an updated tenant service context.

18. The non-transitory computer-readable storage medium of claim 17, having stored thereon further instructions that further configure the processor to:
obtain a subsequent instruction;
determine a subsequent action based on an updated interpretation of said subsequent instruction according to said updated tenant service context; and
command said enterprise-software provider to perform said subsequent action.

19. The non-transitory computer-readable storage medium of claim 15, wherein the instructions that configure the processor to obtain said instruction further comprise instructions configuring the processor to:
obtain a recording of an utterance spoken by said user; and
determine said instruction based at least in part on said recording.

20. The non-transitory computer-readable storage medium of claim 15, wherein the instructions that configure the processor to obtain said tenant service context further comprise instructions configuring the processor to generate a derivative data model based on said tenant service context.

21. The non-transitory computer-readable storage medium of claim 20, wherein the instructions that configure the processor to determine said interpretation of said instruction further comprise instructions configuring the processor to interpret said instruction according to said derivative data model.

* * * * *